US011122238B1

(12) United States Patent
van Amersfoort et al.

(10) Patent No.: US 11,122,238 B1
(45) Date of Patent: Sep. 14, 2021

(54) FRAME INTERPOLATION WITH MULTI-SCALE DEEP LOSS FUNCTIONS AND GENERATIVE ADVERSARIAL NETWORKS

(71) Applicant: Twitter, Inc., San Francisco, CA (US)

(72) Inventors: Joost van Amersfoort, London (GB); Wenzhe Shi, London (GB); Jose Caballero, London (GB); Alfredo Alejandro Acosta Diaz, London (GB); Francisco Massa, London (GB); Johannes Totz, London (GB); Zehan Wang, London (GB)

(73) Assignee: Twitter, Inc., San Francisco, CA (US)

( * ) Notice: Subject to any disclaimer, the term of this patent is extended or adjusted under 35 U.S.C. 154(b) by 129 days.

(21) Appl. No.: 16/183,311

(22) Filed: Nov. 7, 2018

Related U.S. Application Data

(60) Provisional application No. 62/582,497, filed on Nov. 7, 2017.

(51) Int. Cl.
| | | |
|---|---|---|
| *G06N 3/08* | (2006.01) | |
| *G06T 3/40* | (2006.01) | |
| *H04N 7/01* | (2006.01) | |

(52) U.S. Cl.
CPC ............ *H04N 7/0137* (2013.01); *G06N 3/08* (2013.01); *G06T 3/4007* (2013.01); *H04N 7/0127* (2013.01)

(58) Field of Classification Search
None
See application file for complete search history.

(56) References Cited

U.S. PATENT DOCUMENTS

| | | | | |
|---|---|---|---|---|
| 2017/0347110 | A1* | 11/2017 | Wang | G06K 9/6215 |
| 2018/0293713 | A1* | 10/2018 | Vogels | G06T 7/0002 |
| 2019/0095795 | A1* | 3/2019 | Ren | G06N 3/082 |
| 2019/0130530 | A1* | 5/2019 | Schroers | G06T 3/4046 |
| 2020/0012940 | A1* | 1/2020 | Liu | H04N 7/0135 |
| 2020/0143522 | A1* | 5/2020 | Vogels | G06T 5/002 |

* cited by examiner

*Primary Examiner* — Idowu O Osifade
(74) *Attorney, Agent, or Firm* — Brake Hughes Bellermann LLP

(57) ABSTRACT

A method includes selecting two or more frames from a plurality of frames of a video, downscaling the two or more frames, estimating a flow data based on an optical flow associated with the downscaled two or more frames, upscaling the flow data, generating a refined flow data based on the upscaled flow data and the downscaled two or more frames, upscaling the refined flow data, and synthesizing an image based on the upscaled refined flow data and the two or more frames.

20 Claims, 4 Drawing Sheets

FRAME INTERPOLATION WITH MULTI-SCALE DEEP LOSS FUNCTIONS AND GENERATIVE ADVERSARIAL NETWORKS

CROSS-REFERENCE TO RELATED APPLICATION

This application claims the benefit of U.S. Provisional Application No. 62/582,497, filed on Nov. 7, 2017, titled "FRAME INTERPOLATION WITH MULTI-SCALE DEEP LOSS FUNCTIONS AND GENERATIVE ADVERSARIAL NETWORKS," which is incorporated herein by reference in its entirety.

FIELD

Embodiments relate to synthetically increasing the framerate of a video using frame interpolation.

BACKGROUND

Frame interpolation includes synthetically generating a plausible intermediate video frame given two adjacent video frames. Frame interpolation typically includes identifying characteristics of natural motion present in a video and generating a frame(s) that respects this modelling of motion. Frame interpolation is commonly supported by optical flow. Optical flow relates consecutive frames in a sequence describing the displacement that each pixel undergoes from one frame to the next.

One solution for frame interpolation is therefore to assume constant velocity in motion between existing frames and synthesize intermediate frames via warping using a fraction of the flow from consecutive frames. However, optical flow estimation is difficult and time-consuming, and there is in general no consensus on a single model that can accurately describe it. Different models have been proposed based on inter-frame color or gradient constancy, but these are susceptible to fail in challenging conditions such as illumination changes or nonlinear structural changes. As a result, methods that obtain frame interpolation as a derivative of flow fields suffer from inaccuracies in flow estimation.

SUMMARY

In a general aspect a method and a non-transitory computer-readable storage medium having stored thereon computer executable program code which, when executed on a computer system, causes the computer system to perform steps. The steps include selecting two or more frames from a plurality of frames of a video, downscaling the two or more frames, estimating a flow data based on an optical flow associated with the downscaled two or more frames, upscaling the flow data, generating a refined flow data based on the upscaled flow data and the downscaled two or more frames, upscaling the refined flow data, and synthesizing an image based on the upscaled refined flow data and the two or more frames.

In another general aspect a system includes a frame selector configured to select two or more frames from a plurality of frames of a video, an interpolation module configured to downscale the two or more frames, estimate a flow data based on an optical flow associated with the downscaled two or more frames, upscale the flow data, generate a refined flow data based on the upscaled flow data and the downscaled two or more frames, upscale the refined flow data, and synthesize an image based on the upscaled refined flow data and the two or more frames, and a frame insertion module configured to insert the image between the two or more frames as a frame in the video.

Implementations can include one or more of the following features. For example, the optical flow is estimated based on a displacement that each pixel of the downscaled two or more frames undergoes from one frame to the next. The downscaling of the two or more frames includes a plurality of downscaling operations using a scaling factor, and the upscaling of the flow data includes upscaling by the scaling factor. The downscaling of the two or more frames includes a first downscaling using a scaling factor, a second downscaling using the scaling factor, a third downscaling using a scaling factor, and the upscaling of the flow data is a first upscaling by the scaling factor, the generating of the refined flow data is generating a first refined flow data and the synthesizing of the image is synthesizing a first image, the steps further include upscaling the first refined flow data, generating a second refined flow data based on the upscaled first refined flow data and the first downscaled two or more frames, upscaling the second refined flow data, and synthesizing a second image based on the upscaled second refined flow data and the two or more frames.

For example, the steps further include synthesizing a second image based on the upscaled flow data and the two or more frames. The synthesizing of the image is synthesizing a first image, the steps further include synthesizing a second image based on the upscaled flow data and the two or more frames, synthesizing a third image based on further upscaled, further refined flow data and the two or more frames, and generating a frame using the first image, the second image and the third image. The estimating of the flow data includes using convolutional neural network (CNN) having a trained loss function, the generating of the refined flow data includes using the CNN having the trained loss function, and the synthesizing of the image includes using the CNN having the trained loss function. The loss function is trained using a Generative Adversarial Network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
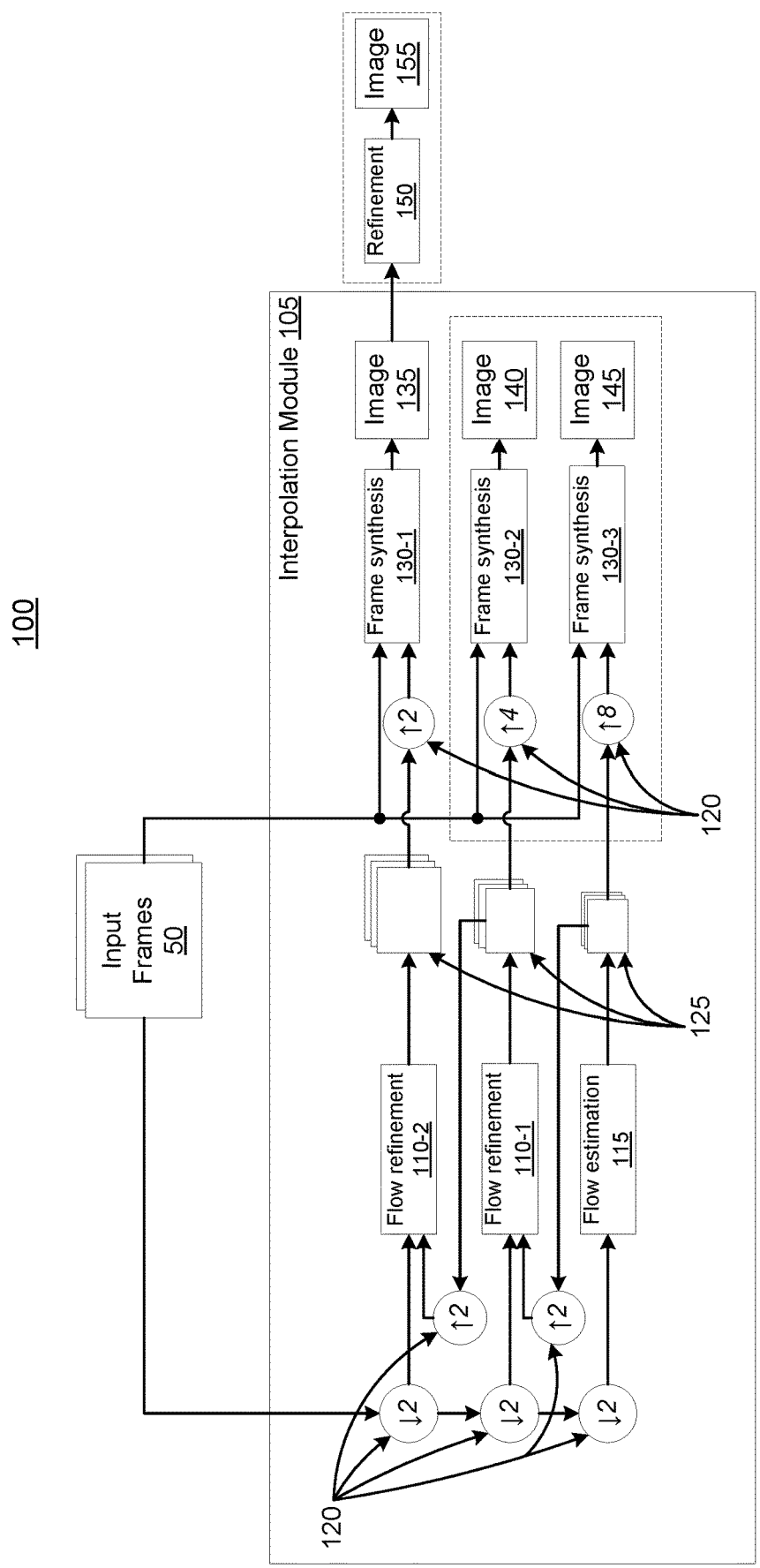
FIG. 1 illustrates a flow diagram for a frame interpolation module according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

In optical flow features can be trained using deep learning techniques (e.g., Convolutional Neural Networks (CNNs)) in a supervised setup mapping two frames with their ground truth optical flow field. The introduction of spatial transformer networks can enable spatial transformation of an image as part of a differentiable network. Therefore, a transformation can be learnt implicitly by a network in an unsupervised fashion, and this can allow direct performance of frame interpolation with an end-to-end differentiable network.

Choices in the network design and training strategy can directly affect interpolation performance as well as runtime. Multi-scale residual estimations can be used in frame interpolation neural network designs. Further, the performance of trainable frame interpolation is directly conditioned by the validity of the modelling in the training loss function. The same difficulties in modelling optical flow apply to frame interpolation derived from flow features. Therefore, simple models based on intensity constancy are preferred. Further, training strategies for low-level vision tasks can improve on pixel-wise error metrics making use of complex data representations and adversarial training, leading to visually more pleasing results.

Example implementations can include a real-time frame interpolation method that can generate realistic intermediate frames with high Peak Signal-to-Noise Ratio (PSNR). This improved frame interpolation model combines a pyramidal structure of optical flow modeling with spatial transformer networks. In addition, implementations can include deep loss functions and generative adversarial training to minimize natural limitations of intensity variations and nonlinear deformations.

Frame interpolation can generate an intermediate frame given two consecutive video frames. The generated frame should consider object motion and occlusions in order to create a plausible frame that preserves structure and consistency of data across frames. Frame interpolation can rely on flow estimation to obtain a description of how a scene moves from one frame to the next. For example, define two consecutive frames with $I_0$ and $I_1$ with an optical flow relationship formulated as:

$$I_0(x,y)=I_1(x+u,y+v) \tag{1}$$

where u, and v are pixel-wise displacement fields for dimensions x and y.

$I(\Delta)$ can refer to an image I with coordinate displacement $\Delta=(u, v)$. Therefore, $I_0=I_1(\Delta)$. Techniques for estimation of $\Delta$ can include, for example, minimization of an energy functional given flow smoothness constraints and using neural networks. Flow amplitude can be expected to vary from small displacements of slow moving details to large displacements caused by fast motion or camera panning. According to an example implementation, in order to efficiently account for this variability, flow can be decomposed into multiple scales. Finer flow scales can take advantage of estimations at lower coarse scales to progressively estimate the final flow in a coarse-to-fine progression. Given an optical flow between two frames, an interpolated intermediate frame $\hat{I}_{0.5}$ can be estimated by projecting the flow to time t=0.5 and determining intensity values bi-directionally from frames $I_0$ and $I_1$.

Neural network techniques can be used for the supervised learning of optical flow fields from labelled data. However, labelled data can be scarce and expensive to produce. Minimizing this limitation can include training on rendered videos where ground truth flow is known. In addition, a technique to directly interpolate images using large convolution kernels that are estimated for each output pixel value can be used.

Spatial transformer networks can use flow estimation implicitly. Spatial transformer networks can enable learning and applying transformations to modify the location of spatial information as part of a differentiable network. This technique can use unsupervised learning of optical flow by learning how to warp a video frame onto its consecutive frame. Further, spatial transformer networks can be used to directly synthesize an interpolated frame using a CNN to estimate flow features and spatial weights to estimate occlusions. The flow is estimated at different scales. However, fine flow estimations do not reuse coarse flow estimation. Therefore, spatial transformer networks can be further improved.

Optimization based training algorithm require a loss function to define the accuracy with which the network is able to perform a task, such as a frame interpolation regression task. For low-level vision problems, this can include a pixel-wise metric such as squared or absolute error measure as these are objective definitions of the distance between true data and its estimation. Departing from pixel space to evaluate modelling error in a different dimensional space can further improve this technique.

High dimensional features from a VGG network can be helpful in constructing a training loss function that correlates better with human perception than Mean-Squared Error (MSE) for the task of image super-resolution. Further, example implementations can include an improved training technique including training for frame interpolation by involving adversarial losses (e.g., through the use of Generative Adversarial Networks (GANs)).

An example implementation can include a neural network solution for frame interpolation that implements a multi-scale refinement of the flow learnt implicitly. The structural change to progressively apply and estimate flow fields has runtime implications as it presents an efficient use of computational network resources. Additionally, implementations can include a synthesis refinement module for the interpolation result. Further, a higher level, more expressive interpolation error modelling combining classical color constancy, a perceptual loss and an adversarial loss functions.

Example implementations can include, at least, a real-time neural network for high-definition video frame interpolation, a multi-scale network architecture that progressively applies and refines flow fields, a reconstruction network module that refines frame synthesis results, and a training loss function that combines color constancy, a perceptual and adversarial losses. Example implementations use a trainable CNN architecture configured to estimate an interpolated frame from two input frames $I_0$ and $I_1$, where given many examples of triplets of consecutive frames, an optimization task is solved by minimizing a loss between the estimated frame $I_{0.5}$ and the ground truth intermediate frame $I_{0.5}$.

FIG. 1 illustrates a flow diagram for a frame interpolation module according to at least one example embodiment. As shown in FIG. 1, system 100 includes input frames 50 (e.g., as frames of video data) and an interpolation module 105. In FIG. 1, dashed lines surround optional features. Interpolation module 105 includes flow refinement blocks 110, flow estimation block 115, a plurality of bilinear re-scalers 120, synthesis flow feature blocks 125, frame synthesis blocks 130 and images 135, 140, 145. The system 100 further (and optionally) includes synthesis refinement module 150 and image 155.

In FIG. 1, flow is estimated from at least two input frames 50 at scales ×8, ×4 and ×2. The finest flow scale is used to synthesize the intermediate frame. Optionally, intermediate flow scales can be used to synthesize coarse interpolated frames that can contribute to a training cost function, and the synthesized frame can be further processed through a synthesis refinement module 150.

As shown in FIG. 1, the flow estimation block 115 receives frames 50 having been downscaled ×2 (using bilinear re-scalers 120) a plurality of times. In FIG. 1, the frames 50 are downscaled three (3) times, however, example implementations are not limited thereto. Therefore, the input to flow estimation block 115 is the input frames 50 each downscaled ×8. Flow estimation block 115 is configured to determine the displacement (e.g., optical flow) that each pixel of the downscaled ×8 frames undergoes from one frame to the next. The estimated optical flow features of the flow estimation block 115 is output as the smallest (e.g., lowest resolution or coarsest) of the synthesis flow feature blocks 125.

The coarse flow features are up-scaled ×2 (using a bilinear re-scaler 120) and used as input together with the two input frames 50 each downscaled ×4 to a first flow refinement block 110-1. The first flow refinement block 110-1 is configured to use the up-scaled coarse flow features to generate finer flow estimations based on the higher image resolutions of the two input frames 50 each downscaled ×4. The estimated optical flow features of the first flow refinement block 110-1 is output as the middle (e.g., mid-resolution) of the synthesis flow feature blocks 125. The mid-resolution flow features are up-scaled ×2 (using a bilinear re-scaler 120) and used as input together with the two input frames 50 each downscaled ×2 to a second flow refinement block 110-2. The second flow refinement block 110-2 is configured to use the up-scaled mid-resolution flow features to generate finer flow estimations based on the higher image resolutions of the two input frames 50 each downscaled ×2. The estimated optical flow features of the second flow refinement block 110-2 is output as the highest (e.g., high-resolution (but not full-resolution)) of the synthesis flow feature blocks 125.

The high-resolution flow features are up-scaled ×2 (using a bilinear re-scaler 120) and used as input together with the two input frames 50 to a first frame synthesis block 130-1. The frame synthesis block 130-1 is configured to use the up-scaled high-resolution flow features of the synthesis flow feature blocks 125 to generate the image 135 based on the two input frames 50. The image 135 represents a synthesized interpolated frame. The interpolated frame is between the two input frames 50. Therefore, the image 135 represents a synthesized interpolated intermediate frame.

Optionally, the mid-resolution flow features can be up-scaled ×4 (using a bilinear re-scaler 120) and used as input together with the two input frames 50 to a second frame synthesis block 130-2. The frame synthesis block 130-2 can be configured to use the up-scaled mid-resolution flow features of the synthesis flow feature blocks 125 to generate the image 140 based on the two input frames 50. Optionally, the coarse flow features can be up-scaled ×8 (using a bilinear re-scaler 120) and used as input together with the two input frames 50 to a third frame synthesis block 130-3. The frame synthesis block 130-3 can be configured to use the up-scaled mid-resolution flow features of the synthesis flow feature blocks 125 to generate the image 145 based on the two input frames 50. Using the same logic as above, the image 140 and the image 145 can represent a synthesized interpolated intermediate frame. The image 135, the image 140 and the image 145 can be pixel-wise combined in some way to generate the synthesized interpolated intermediate frame for the two input frames 50.

As an example, $\Delta$ can represent the flow from time point 0.5 to 1, and synthesis features can be referred to as $\Gamma=\{\Delta, W\}$, where spatial weights $W_{i,j}=[0; 1] \ \forall_{i,j}$ can be used for occlusions and dis-occlusions. The synthesis interpolated frame is then given by:

$$\hat{I}_{0.5\ syn} = f_{syn}(I_0, I_1, \Gamma) = W \circ I_0(-\Delta) + (1-W) \circ I_1(\Delta) \qquad (2)$$

where $\circ$ denotes the Hadamard product.

Eqn. 2 can be used to synthesize the final interpolated frame and can be referred to as voxel flow. Voxel flow can include a spatial flow delta or change and temporal weights. Example implementations reuse a coarse flow estimation for further processing with residual modules to more efficiently use computational resources.

Multi-scale pyramidal methods are recurrent approaches to estimate optical flow. These lend themselves to the aggregation of coarse flow estimated on a low-resolution version of the input images, with finer flow estimations drawn from higher image resolutions up to the native input image resolution. This is particularly effective to find large displacements more easily exposed at coarser scales, which are then refined with smaller displacement found at finer scales by recursively estimating the flow from images warped by coarser flow estimations.

To estimate synthesis features $\Gamma$ a pyramidal structure can be used to progressively apply and estimate optical flow between two frames at different scales j=[1, J]. Synthesis features estimated at different scales can be referred to as $\Gamma_{x,j}$. If U and D denote ×2 bilinear up-sampling and down-sampling matrix operators, flow features can be obtained as $$\Gamma_{x,j} = \begin{cases} f_{course}(D^j I_0, D^j I_1) & \text{if } j = J \\ f_{fine}(D^j I_0, D^j I_1, U\Gamma_{x(j+1)}) & \text{otherwise} \end{cases} \qquad (3)$$

Figure 2:
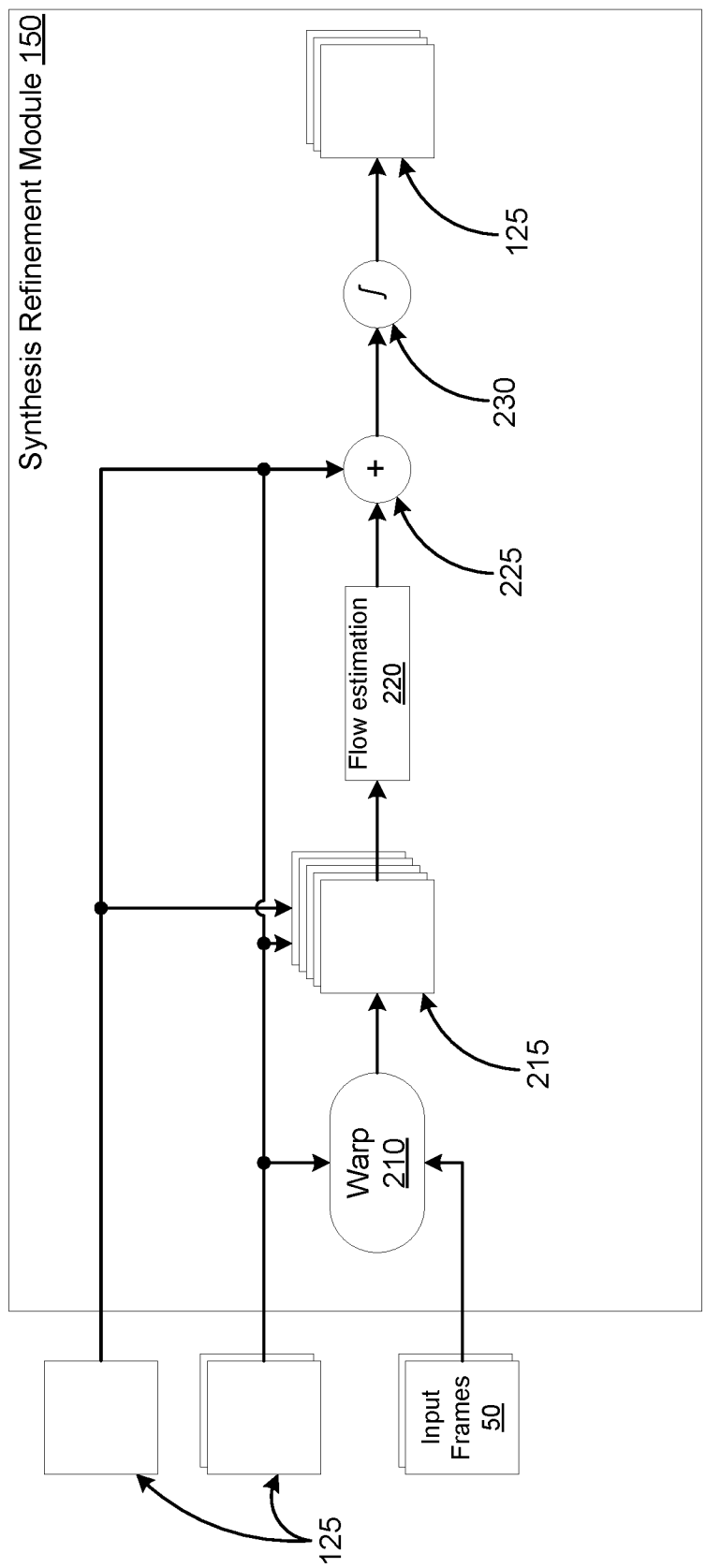
FIG. 2 illustrates a flow diagram for a frame refinement module according to at least one example embodiment.

As shown in FIG. 1, the image 135 can be used as an input for the synthesis refinement module 150 to generate the image 155. The image 155 can be a synthesized interpolated intermediate frame. FIG. 2 illustrates a flow diagram for a frame refinement module according to at least one example embodiment.

As shown in FIG. 2, the synthesis refinement module 150 includes a warp block 210, combined image and synthesis flow feature blocks 215, a flow estimation block 220, a summing block 225, a function block 230 and synthesis flow feature blocks 125. The synthesis refinement module 150 receives as input the input frames 50 and synthesis flow feature blocks 125.

As shown in FIG. 2, a coarse flow estimation is used to warp 210 the input frames 50, which are then passed together with the coarse synthesis flow features 215 to the flow estimation block 220. The finer flow estimation is obtained as the sum 225 of the flow estimation 220 output and the coarse synthesis flow features. A tanh nonlinearity function 230 can be used to clip the result to [−1,+1].

Flow refinement can be expressed as:

$$f_{fine}(I_0, I_1, \Gamma) = \tanh(\Gamma + f_{res}(I_0(-\Delta), I_1(\Delta), \Gamma)) \quad (4)$$

where the non-linearity keeps the synthesis flow features within the range [−1, 1].

In the below example implementations J is shown as J=3 (however, example implementations are not limited thereto). Further, the final features can be upsampled from the first scale to be $\Gamma = U\Gamma_{x1}$. In addition, intermediate synthesis features can be used to obtain intermediate synthesis results as $$\hat{I}_{0.5syn, xj} = f_{syn}(I_0, I_1, U^j \Gamma_{xj}) \quad (5)$$

As described in more detail below intermediate synthesis results can be useful to facilitate network training.

TABLE 1

| Layer | Convolution kernel | Non-linearity |
| --- | --- | --- |
| 1 | $N_i \times 32 \times 3 \times 3$ | Rectified Linear Unit |
| 2, . . . , 5 | $32 \times 32 \times 3 \times 3$ | Rectified Linear Unit |
| 6 | $32 \times N_o \times 3 \times 3$ | φ |

Table 1 shows a convolutional network block used for coarse flow, flow residual and reconstruction refinement modules. Convolution kernels correspond to number of input and output features, followed by kernel size dimensions 3×3.

The coarse flow estimation and flow residual modules are both based on the CNN architecture described in Table 1. Both modules use φ=tanh to generate $N_o$=3 output synthesis features within the range [−1,1], corresponding to flow features Δ for x and y displacements, and a weighting matrix W. For $N_c$ the number of image color channels, coarse flow estimation uses $N_i = 2N_c$, whereas residual flow uses $N_i = 2N_c + 3$.

Frame synthesis can sometimes fail in cases of large and complex motion or challenging occlusions, where flow estimation may be inaccurate. In these situations, artifacts can produce an unnatural look for moving regions of the image that benefit from further correction. Therefore, example implementations introduce a synthesis refinement module that consists of a CNN allowing for further joint processing of the synthesized image with the original input frames the synthesized image is based on.

$$\hat{I}_{0.5\,ref} = f_{ref}(\hat{I}_{0.5\,syn}, I_0, I_1) \quad (6)$$

This module also uses the convolutional block in Table 1 with $N_i = 3N_c$, $N_o = N_c$ and φ the identity function. Example implementations can define the optimization problem as:

$$\hat{I}_{0.5} = \underset{\theta}{\operatorname{argmin}} \frac{1}{N} \sum_{n=1}^{N} \sum_i \lambda_i l_i(f_\theta(I_0^n, I_1^n), I_{0.5}^n) \quad (7)$$

The output $\hat{I}_{0.5}$ can either be $\hat{I}_{0.5\,syn}$ or $\hat{I}_{0.5\,ref}$ depending on whether the optional refinement module is used, and θ represents all trainable parameters in the network and $l_i$ are different loss functions defined between the network output and the ground-truth frame.

In an example implementation, the multi-scale frame synthesis described above can be used to define a loss function at the finest synthesis scale and a synthesis loss can be defined as:

$$l_{syn,x1} = \tau_{syn}(\hat{I}_{0.5\,syn,x1}, I_{0.5}) \quad (8)$$

where $\tau_{syn}$ is a distance metric.

However, an optimization task based solely on this cost function can less than optimal because it leads to an ill-posed solution. For example, for one particular flow map there may be multiple possible solutions. It is therefore likely that the solution space contains many local minima, making it challenging to solve via gradient descent. The network can for instance easily get stuck in degenerate solutions where a case with no motion, $\Gamma_{x1}=0$, is represented by the network as $\Gamma_{x1} = U\Gamma_{x2} + U^2\Gamma_{x3}$, in which case there are infinite solutions for the flow fields at each scale.

In order to prevent this, example implementations can include supervising the solution of all scales such that flow estimation is required to be accurate at all scales. In an example implementation, the following multi-scale synthesis loss function is defined:

$$l_{multisyn} = \sum_{j=1}^{J} \lambda_{syn,j} l_{syn,xj} \quad (9)$$

The weighting of this multiscale loss can be heuristically chosen to be $\lambda_{syn,j} = \{1 \text{ if } j=1; 0.5 \text{ otherwise}\}$ to prioritize the synthesis at the finest scale. Additionally, the extended network using the synthesis refinement module includes a term to the cost function expressed as:

$$l_{ref} = \tau_{ref}(\hat{I}_{0.5ref}, I_{0.5}) \quad (10)$$

and the total loss function for J=3 can be defined as $$L = l_{multisyn} + l_{ref} = l_{syn,x1} + \frac{1}{2}\sum_{2,3} l_{syn,xj} + l_{ref} \quad (11)$$

Example implementations can combine pixel-wise distance metrics with higher order metrics given by a deep network. As a pixel-wise metric the $l_1$-norm can be chosen to produce improved (e.g., sharper) interpolation results. Denoting with γ the transformation of an image to its VGG representation, the distance metrics $\tau_{syn}$ and $\tau_{ref}$ are therefore given by:

$$\tau(a,b) = \|a-b\|_1 + \lambda_{VGG}\|\gamma(a) - \gamma(b)\|_1 \quad (12)$$

where $\lambda_{VGG} = 0.001$.

In the loss functions described above, there is no mechanism to avoid solutions that may not be visually pleasing. A successful approach to force the solution manifold to correspond with images of a realistic appearance has been GAN training. We can incorporate such loss term to the objective function Eqn. (11) as follows:

$$L = l_{multisyn} + l_{ref} + 0.001 l_{GAN} \quad (13)$$

The synthesis network described above can be referred to as the generator network $f_{\theta G}$, the GAN term $l_{GAN}$ optimizes the loss function as:

$$\min_{\theta_G} \max_{\theta_D} \mathbb{E}_{I_{0.5} \sim P_{train}(I_{0.5})}[\log d_{\theta_D}(I_{0.5})] + \quad (14)$$

$$\mathbb{E}_{(I_0,I_1) \sim P_f(I_0 I_1)}[\log(1 - d_{\theta_D}(f_{\theta_G}(I_0, I_1)))] \quad (15)$$

where $d_{\theta_D}$ represents a discriminator network that tries to discriminate original frames from interpolated results and the weighting parameter 0:001 can be chosen heuristically in order to avoid the GAN loss overwhelming the total loss. Adding this objective to the loss forces the generator $f_{\theta_G}$ to attempt fooling the discriminator.

Example implementations can start with 32 filters and follow up with 8 blocks of convolution, batch normalization and leaky rectified linear unit (ReLU) with alternating strides of 2 and 1. At each block of stride 2 the number of features can be doubled, which may improve the performance of the discriminator.

In an example implementation, a baseline version of the technique described herein performs multi-scale frame synthesis without synthesis refinement and can be trained using a simple color constancy l1-norm loss. The implementation can be improved by first incorporating the coarse-to-fine technique described above. Further improvements can include implementing the training modifications described above An example dataset can include a collection of 60 fps videos from an open-source repository that is resized to 640×360. Training samples can be obtained by extracting one triplet of consecutive frames every second, discarding samples for which two consecutive frames were found to be almost identical with a small squared error threshold.

Network layers from convolutional building blocks based on Table 1 can be orthogonally initialized with, for example, a gain of $\sqrt{2}$, except for the final layer which can be initialized from a normal distribution with standard deviation 0.01. This can help force the network to initialize flow estimation close to zero, which leads to more stable training. Training can be performed on batches of size 128 using frame crops of size 128×128 to diversify the content of batches and increase convergence speed. Further, Adam optimization can be used with learning rate 0.0001 and early stopping can be applied with a patience of 10 epochs. Models can converge in roughly 100 epochs with this setup.

CNNs can have the capability of spatially transforming information through convolutions without the need for data re-gridding with spatial transformer modules. However, computing an internal representation of optical flow that is used by a transformer can be a more efficient structure. In order to recreate hyper-parameter choices, layers in the pure CNN model can be convolutional layers of 32 features and kernel sizes 3×3 followed by ReLU activations, except for the last layer which end with a linear activation.

In some cases where motion is complex (e.g. ambiguous occlusions, overlaid flows of competing orientations), the internal representation of flow can be inaccurate. As a result, the frame directly synthesized using this flow estimation can exhibit spatial distortions resulting in a visually unsatisfying estimation. This can be substantially alleviated with the refinement module described above. Further, as described above, performance can be limited by the fact that the flow estimation in multiple scales is ill-posed. Therefore, composing loss functions which go beyond pixel space, like those using the VGG distance in Eqn. (12) or the loss proposed in Eqn. (13), may not guarantee an improvement of objective metrics such as PSNR but can lead to improved visual quality.

Described herein is a multi-scale network based on recent advances in spatial transformer networks. The example network is an improvement over the state of the art in terms of speed for frame interpolation using CNN. The example network outperforms state-of-the-art reference methods in both PSNR and perceptual quality when trained with the described multi-scale loss function based on VGG and MSE.

Figure 3:
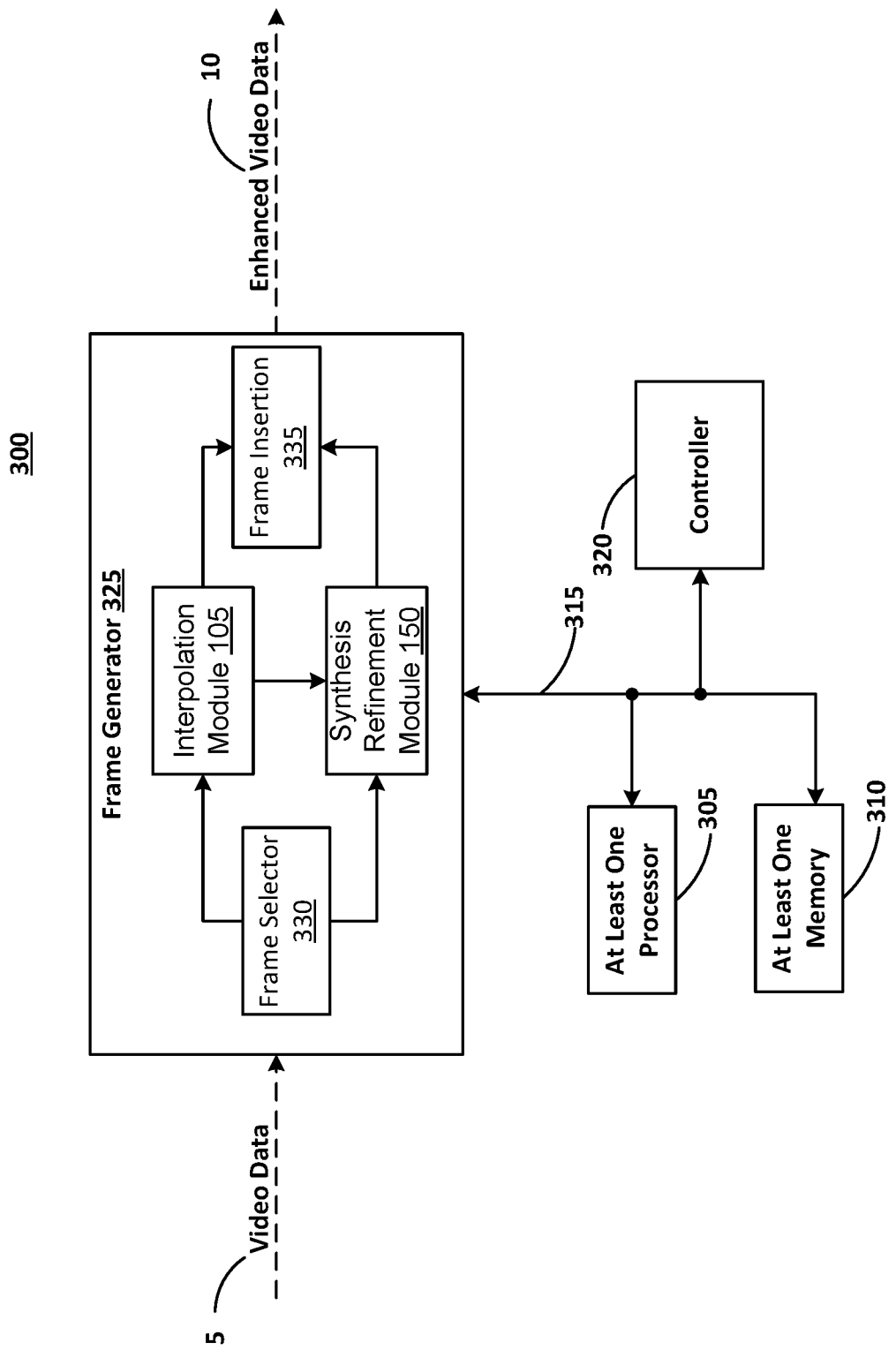
FIG. 3 illustrates a block diagram of frame interpolation system according to at least one example embodiment.

FIG. 3 illustrates a block diagram of frame interpolation system according to at least one example embodiment. As shown in FIG. 3, the frame interpolation system 300 includes the at least one processor 305, at least one memory 310, a controller 320, and a frame generator 325. The at least one processor 305, the at least one memory 310, the controller 320, and the frame generator 325 are communicatively coupled via bus 315.

The at least one processor 305 may be utilized to execute instructions stored on the at least one memory 310 (e.g., non-transitory computer readable medium), so as to thereby implement the various features and functions described herein, or additional or alternative features and functions. The at least one processor 305 and the at least one memory 310 may be utilized for various other purposes. In particular, the at least one memory 310 can represent an example of various types of memory and related hardware and software which might be used to implement any one of the modules described herein.

The at least one memory 310 may be configured to store data and/or information associated with the frame interpolation system 300. For example, the at least one memory 310 may be configured to store codecs associated with encoding video. For example, the frame interpolation system 300 may be an element of a larger system (e.g., a server, a personal computer, a mobile device, and the like). Therefore, the at least one memory 310 may be configured to store data and/or information associated with other elements (e.g., image/video serving, web browsing or wired/wireless communication) within the larger system.

The controller 320 may be configured to generate various control signals and communicate the control signals to various blocks in the frame interpolation system 300. The controller 320 may be configured to generate the control signals to implement the techniques described herein. The controller 320 may be configured to control the frame generator 325 to synthesize a frame and may control the frame generator to implement one or more optional features according to example embodiments. The frame generator 325 may be configured to receive a video data 5 and output enhanced video data 10. The frame generator 325 may convert the video data 5 into discrete video frames.

The at least one processor 305 may be configured to execute computer instructions associated with the controller 320 and/or the frame generator 325. The at least one processor 305 may be a shared resource. For example, the frame interpolation system 300 may be an element of a larger system (e.g., a mobile device). Therefore, the at least one processor 305 may be configured to execute computer instructions associated with other elements (e.g., image/video serving, web browsing or wired/wireless communication) within the larger system.

As shown in FIG. 3, the frame generator 325 includes the interpolation module 105, the synthesis refinement module 150, a frame selector 330 and a frame insertion module 335. The frame selector 330 is configured to select two or more frames from the video data 5. For example, the frame selector 330 can configured to select the at least two input frames 50. The controller 320 can be further configured to instruct the interpolation module 105 to interpolate a frame, as described in detail above, using the selected two or more frames. Further, controller 320 can be configured to instruct the synthesis refinement module 150 to refine the interpolated frame. The a frame insertion module 335 can be configured to insert the interpolated between the two or more frames of the video data 5 and output the modification of video data 6 as the enhanced video data 10.

Figure 4:
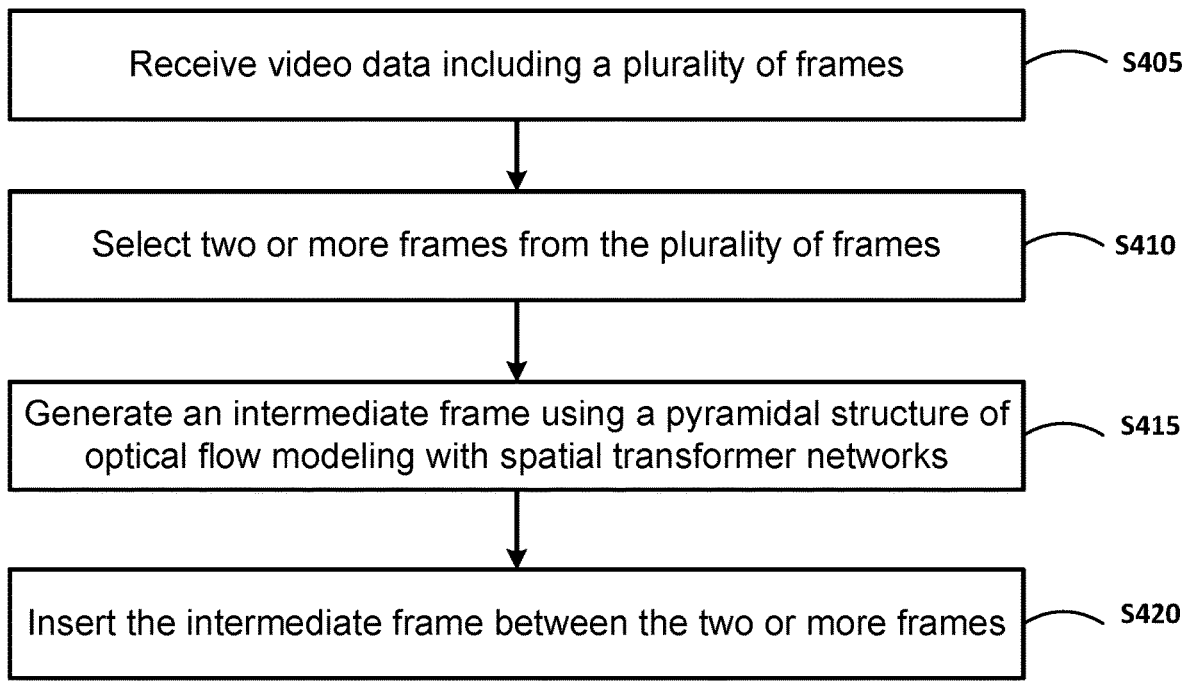
FIG. 4 illustrates a method for generating an intermediate frame of video according to at least one example embodiment.

FIG. 4 illustrates a method for generating an intermediate frame of video according to at least one example embodiment. As shown in FIG. 4, in step S405 video data including a plurality of frames is received and in step S410 two or more frames are selected from the plurality of frames.

In step S415 an intermediate frame is generated using a pyramidal structure of optical flow modeling with spatial transformer networks. For example, the intermediate frame can be generated by the interpolation module 105 using the frame synthesis technique as described in detail above. In step S420 the intermediate frame is inserted between the two or more frames.

Computer memory described herein may include volatile memory and/or non-volatile memory. For example, volatile memory can include RAM, SRAM, DRAM and/or the like. For example, non-volatile memory can include ROM, flash memory, NVRAM, hard disk drives, solid-state drives and/or the like. In one implementation, a computer program product is embodied on an information carrier and/or a non-transitory computer-readable storage medium having stored thereon computer executable program code which, when executed on a computer system, causes the computer system to perform a series of steps. In other words, the computer program product contains instructions that, when executed by a processor, perform one or more methods, such as those described above. The information carrier can be a computer- or machine-readable medium, such as a hard disk drive, a solid-state drive, a CD-ROM, expansion memory, memory on processor.

The devices describe herein may communicate wirelessly through a communication interface, which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, Wi-Fi, or other such transceiver (not shown).

The devices describe herein may be implemented in a number of different forms. For example, the devices may be implemented as a mobile device, a tablet, a cellular telephone, a smart phone, a laptop computer, a desktop computer, an all-in-one computer, a workstation, a remote desktop, an image/video projector, a video play-back device, a function specific computing device and/or the like.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising: selecting two or more frames from a plurality of frames of a video; downscaling the two or more frames; estimating flow data based on the downscaled two or more frames using a trained first neural network, wherein the neural network is a trained optical flow model that progressively applies and refines flow fields; upscaling the estimated flow data; generating, using a second neural network that is trained to estimate optical flow fields, refined flow data based on the upscaled estimated flow data and the downscaled two or more frames, the upscaled estimated flow data and the downscaled two or more frames having a same scaling factor; upscaling the refined flow data; synthesizing an image based on the upscaled refined flow data and the two or more frames; and inserting the image as an interpolated frame into the plurality of frames of the video.

2. The method of claim 1, wherein the optical flow is estimated based on a displacement that each pixel of the downscaled two or more frames undergoes from one frame to the next.

3. The method of claim 1, wherein
the downscaling of the two or more frames includes a plurality of downscaling operations using a scaling factor, and
the upscaling of the estimated flow data includes upscaling by the scaling factor.

4. The method of claim 1, wherein
the downscaling of the two or more frames includes:
applying a first downscaling using a scaling factor,
applying a second downscaling using the scaling factor,
applying a third downscaling using the scaling factor, and
the upscaling of the estimated flow data includes upscaling the estimated flow data by the scaling factor,
the generating of the refined flow data includes generating a first refined flow data, and
the synthesizing of the image includes synthesizing a first image, and the method further comprises:
upscaling the first refined flow data;
generating a second refined flow data based on the upscaled first refined flow data and the first downscaled two or more frames;
upscaling the second refined flow data; and
synthesizing a second image based on the upscaled second refined flow data and the two or more frames.

5. The method of claim 1, further comprising:
synthesizing a second image based on the upscaled estimated flow data and the two or more frames.

6. The method of claim 1, wherein the synthesizing of the image includes synthesizing a first image, the method further comprising:
synthesizing a second image based on the upscaled estimated flow data and the two or more frames;
synthesizing a third image based on further upscaled, further refined flow data and the two or more frames; and
generating a frame using the first image, the second image and the third image.

7. The method of claim 1, wherein
the estimating of the flow data includes using convolutional neural network (CNN) having a trained loss function,
the generating of the refined flow data includes using the CNN having the trained loss function, and
the synthesizing of the image includes using the CNN having the trained loss function.

8. The method of claim 7, wherein the loss function is trained using a Generative Adversarial Network.

9. A system comprising:
a processor; and
a memory including code segments that when executed by the processor cause the processor to:
select two or more frames from a plurality of frames of a video;
downscale the two or more frames,
estimate flow data based on the downscaled two or more frames using a first neural network, wherein the neural network is a trained optical flow model that progressively applies and refines flow fields,
upscale the estimated flow data,
generate, using a second neural network that is trained to estimate optical flow fields, refined flow data based on the upscaled estimated flow data and the downscaled two or more frames, the upscaled estimated flow data and the downscaled two or more frames having a same scaling factor,
upscale the refined flow data, and
synthesize an image based on the upscaled refined flow data and the two or more frames; and
insert the image between the two or more frames as an interpolated frame in the video.

10. The system of claim 9, wherein the optical flow is estimated based on a displacement that each pixel of the downscaled two or more frames undergoes from one frame to the next.

11. The system of claim 9, wherein
the downscaling of the two or more frames includes a plurality of downscaling operations using a scaling factor, and
the upscaling of the estimated flow data includes upscaling by the scaling factor.

12. The system of claim 9, wherein
the downscaling of the two or more frames includes:
applying a first downscaling using a scaling factor,
applying a second downscaling using the scaling factor,
applying a third downscaling using the scaling factor, and
the upscaling of the estimated flow data includes upscaling the estimated flow data by the scaling factor,
the generating of the refined flow data includes generating a first refined flow data, and
the synthesizing of the image is synthesizing a first image, and the code segments that when executed by the processor further cause the processor to:
upscale the first refined flow data;
generate a second refined flow data based on the upscaled first refined flow data and the first downscaled two or more frames;
upscale the second refined flow data; and
synthesize a second image based on the upscaled second refined flow data and the two or more frames.

13. The system of claim 9, further comprising: synthesizing a second image based on the upscaled estimated flow data and the two or more frames.

14. The system of claim 9, wherein the synthesizing of the image is synthesizing a first image, the code segments that when executed by the processor further cause the processor to:
synthesize a second image based on the upscaled estimated flow data and the two or more frames;
synthesize a third image based on further upscaled, further refined flow data and the two or more frames; and
generate a frame using the first image, the second image and the third image.

15. The system of claim 9, wherein
the estimating of the flow data includes using convolutional neural network (CNN) having a trained loss function,
the generating of the refined flow data includes using the CNN having the trained loss function, and
the synthesizing of the image includes using the CNN having the trained loss function.

16. The system of claim 15, wherein the loss function is trained using a Generative Adversarial Network.

17. A non-transitory computer readable storage medium including instructions that when executed by at least one processor, cause the at least one processor to:
select two or more frames from a plurality of frames of a video;
downscale the two or more frames;
estimate flow data based on the downscaled two or more frames using a first neural network, wherein the neural network is a trained optical flow model that progressively applies and refines flow fields;
upscale the estimated flow data;
generate, using a second neural network that is trained to estimate optical flow fields, refined flow data based on the upscaled estimated flow data and the downscaled two or more frames, the upscaled estimated flow data and the downscaled two or more frames having a same scaling factor;
upscale the refined flow data;
synthesize an image based on the upscaled refined flow data and the two or more frames; and
insert the image as an interpolated frame into the plurality of frames of the video.

18. The computer readable storage medium of claim 17, wherein
the estimating of the flow data includes using convolutional neural network (CNN) having a trained loss function,
the generating of the refined flow data includes using the CNN having the trained loss function, and
the synthesizing of the image includes using the CNN having the trained loss function.

19. The computer readable storage medium of claim 18, wherein the loss function is trained using a Generative Adversarial Network.

20. The computer readable storage medium of claim 17, wherein the optical flow is estimated based on a displacement that each pixel of the downscaled two or more frames undergoes from one frame to the next.

* * * * *